April 19, 1966 S. GROSS ETAL 3,246,368
INJECTING PRESS AND FLASK HOLDER THEREFOR
Filed March 8, 1963 3 Sheets-Sheet 1
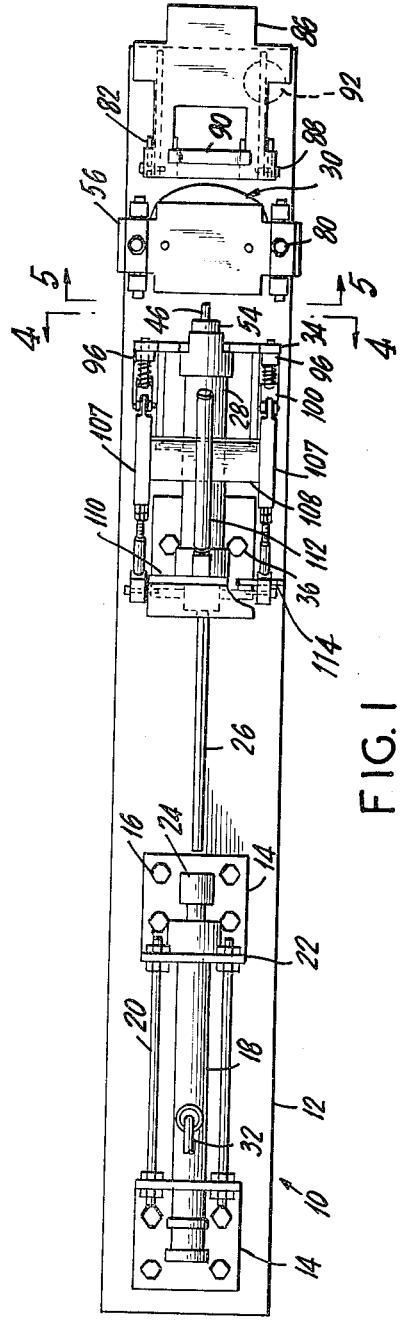
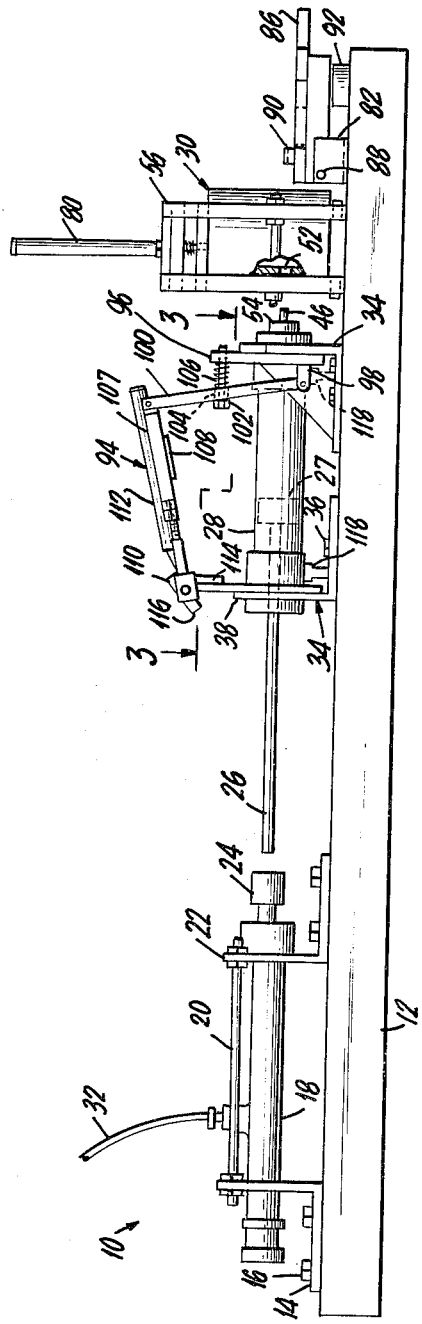
INVENTORS
SAMUEL GROSS
HERMAN BERGER
BY Felshin and Rosen
ATTORNEYS April 19, 1966 S. GROSS ETAL 3,246,368
INJECTING PRESS AND FLASK HOLDER THEREFOR
Filed March 8, 1963 3 Sheets-Sheet 3

INVENTORS
SAMUEL GROSS
HERMAN BERGER
BY Felshin and Rosen
ATTORNEYS.

United States Patent Office 3,246,368
Patented Apr. 19, 1966

3,246,368
INJECTING PRESS AND FLASK
HOLDER THEREFOR
Samuel Gross, Bronx, and Herman Berger, Brooklyn,
N.Y., assignors to Lloyds Laboratory, New York, N.Y.
Filed Mar. 8, 1963, Ser. No. 263,839
7 Claims. (Cl. 18—30)

This invention relates to apparatus for injecting plastic material into the mold cavity of a denture flask for making full or partial dentures.

In apparatus such as that illustrated and described in U.S. Patent No. 2,976,570 issued March 28, 1961, the flask is provided with a threaded hole into which the outlet end of the injector for the plastic material is screwed. Such an arrangement is extremely cumbersome and time consuming because of the necessity of unscrewing the injector from the flask to mold succeeding dentures.

The apparatus can also include a holder for the flask in order to keep the upper and lower parts of the flask in proper position with respect to each other during the molding operation. A commonly used flask holder in the industry today includes screw threaded members which are required to be unscrewed in order to remove the flask from its holder and place another flask in the holder for a successive molding operation to form another full or partial denture.

One of the objects of the present invention is to provide improved apparatus which obviates the difficulties referred to above.

Another object is to provide apparatus for molding full or partial dentures wherein provision is made for quick and easy removal of the flask and its holder from the apparatus so that the molding of full and partial dentures can be accomplished at a greater rate of production with consequently substantial reduction in cost.

A further object is to provide an improved holder for a denture flask which is especially well adapted for quick and easy removal from the molding apparatus and which includes provision for quick and easy removal of the flask, thereby providing increased economies in operation.

The above and other objects, features and advantages of the invention will be more fully understood from the following description of the invention considered in connection with the accompanying illustrative drawings:

FIG. 1 is a top plan view of an apparatus in accordance with the present invention;

FIG. 2 is a side view of the apparatus;

Figure 3:
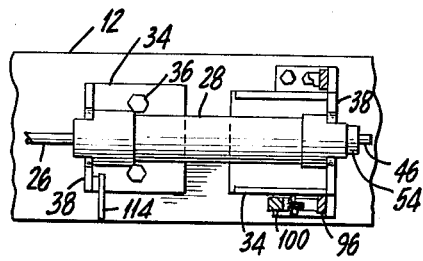
FIG. 3 is a horizontal sectional view on a larger scale, taken on line 3—3 of FIG. 2.

Referring now to the drawings in detail, the apparatus 10 is preferably mounted on a convenient support, herein shown as a wooden plank 12. A pair of longitudinally spaced brackets 14 is suitably secured to the plank as by screws 16, and a hydraulic cylinder 18 is suitably supported on the brackets. Preferably a pair of screw threaded rods 20 are secured at their respective ends to the upstanding legs 22 of the brackets to provide a rigid support for cylinder 18. The cylinder is provided with the usual hydraulic plunger 24 which is in position for engaging the piston rod 26 which operates piston 27 of a cylindrical injector 28 which contains a suitable plastic material, for example, an acrylic plastic, which is injected into the mold cavity of a denture flask 30 for the molding of the full or partial denture. The plunger 24 of cylinder 18 is operated from a suitable source of hydraulic pressure fluid which is pumped into the cylinder via conduit 32. It will be understood that pneumatic or electrical means can also be provided for operating piston rod 26 of the injector.

Figure 4:
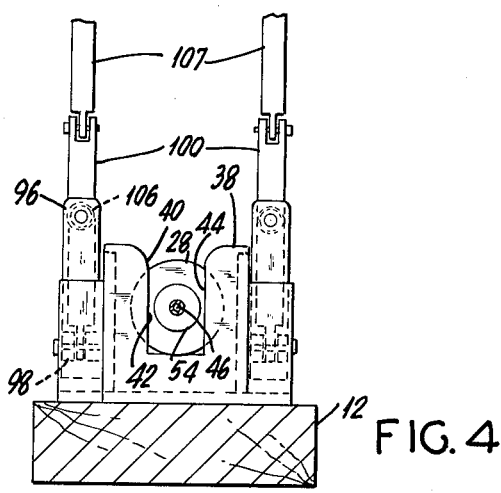
FIG. 4 is a vertical sectional view, on a larger scale, taken on line 4—4 of FIG. 1 with parts of the apparatus in an elevated position.

The injector is removably mounted on a pair of longitudinally spaced brackets 34 also suitably secured to plank 12 as by screws 36. Each of the upstanding legs 38 of the brackets is provided with an open ended vertical slot 40 (FIG. 4) so that the injector can be readily removed or mounted on its brackets by a simple vertical movement. For this purpose, the opposite ends of the injector have flat sides 42 which slidably engage the side edges 44 of the slot to permit vertical mounting and dismounting of the injector on its brackets and to prevent rotation of the injector in its mounted position.

Figure 8:
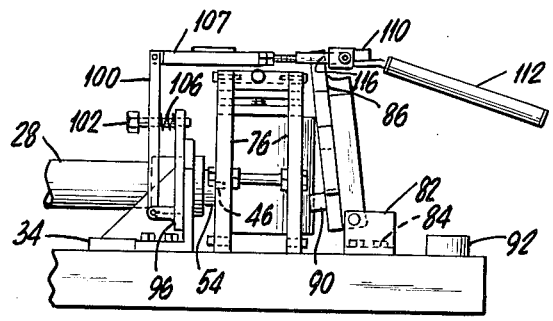
FIG. 8 is a side view of part of the apparatus in operative or locking position for a molding operation.

The outlet end of the injector is provided with a cylindrical nozzle 46 through which the plastic material is ejected. The flask 30 has an upper part 48 (FIG. 5) and a lower part 50 and the upper part is provided with an inlet opening 52 which is in communication with the mold cavity. In the operative position of the apparatus, as illustrated by FIG. 8, the nozzle of the injector extends into the inlet opening 52 of the flask for passage of the plastic material from the injector into the mold cavity. The nozzle is surrounded by a resilient apertured disc 54 which provides a cushion against which the flask bears as it is tightly held in position during the molding operation. It is to be noted that the outer surface of nozzle 46 is smooth and the internal wall defining opening 52 is also smooth, and the heretofore cumbersome threaded connection between the outlet of the injector and the inlet of the flask has been eliminated.

Referring now more particularly to the flask, it is to be noted that the upper and lower parts thereof are held in proper relative position with respect to each other by holder 56. The flask holder includes provision for quick and easy removal of the flask. More particularly, the holder comprises a horizontal support plate 58 which is supported on the upper surface of plank 12. The upper surface 60 of the plate provides a support for the bottom of the flask. A pair of separate clamping plates 62 is supported on the top of the flask and the plates are held in spaced relation with respect to each other by a pair of compression springs 64 positioned between the plates. Each of the spring encircles a screw 66 which is screwed into the lower plate 68 and the upper part of the screw extends through a clearance hole 70 provided in the upper plate 72. The heads of the screws provide a stop against which the upper plate bears under the resilient force of the spring.

Flask locking means 74 is pivotally connected to opposite ends of the flask support plate 58. The locking means are identical and therefore only one will be described. The locking means comprises a pair of laterally spaced elongated rigid members 76 which are pivotally connected at their respective lower ends to the adjacent end of the support plate. A rigid cross bar 78 extends between the laterally spaced members 76 and is pivotally connected, at its opposite ends, to the other ends of members 76. A handle 80 is secured to the cross-bar for operating the latter.

Figure 5A:
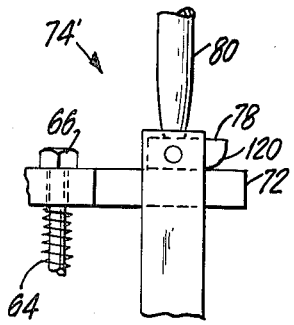
FIG. 5A is a detail showing a modification.
Figure 5:
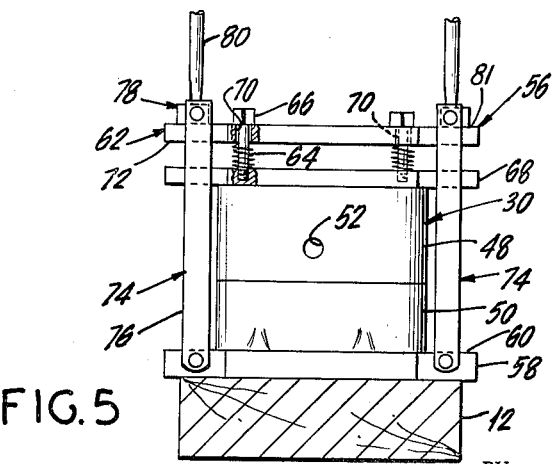
FIG. 5 is a vertical view, on a larger scale, taken on line 5—5 of FIG. 1.
Figure 6:
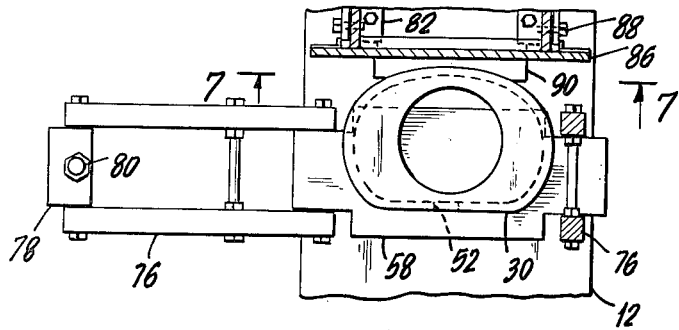
FIG. 6 is a top plan view of the flask holder in an inoperative or open position, and also illustrates a part of the apparatus in engagement with the flask.
Figure 7:
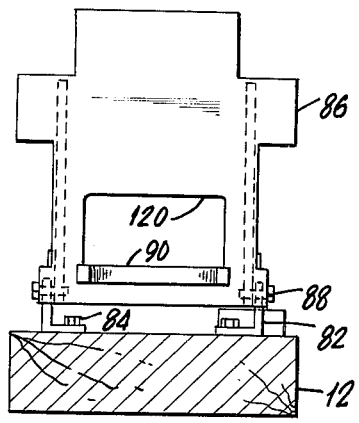
FIG. 7 is a vertical view taken on line 7—7 of FIG. 6.

It is to be observed that the length of members 76 is such, that in the inoperative or released position of the holder, as illustrated by FIG. 5, with handles 80 in a vertical position, cross-bar 78 disengages the upper surface of plate 72 or only lightly engages it, whereby the springs are not compressed. To releasably lock the flask in the holder, all that is necessary is to rotate left cross-bar 78 90°, in a counterclockwise direction, as viewed in FIG. 5, and right cross-bar 78, similarly, but in an opposite or clockwise direction, as viewed in FIG. 5, so that cam edge 81 of the cross-bar engages plate 72 to move the latter toward plate 68 and thereby compress springs 64, whereby flask 30 is releasably, but tightly held, between plates 68 and 58. It is to be noted that the cross-bar 78 is rectangular in cross-section to form a cam locking member and the handles are horizontal in their locking position.

To release the flask from the holder, it is merely necessary to move the handles from their horizontal locking position to a vertical releasing position, and thereafter rotate members 76 away from each into a horizontal position, whereby the clamping plates 62 and the flask can be readily removed.

Holder 56 and the flask 30 are easily and releasably held in position for the molding operation, as illustrated by FIG. 8. For this purpose, a pair of laterally spaced brackets 82 is spaced longitudinally from nozzle 46 of the injector and is suitably secured to plank 12, as by bolts 84. A locking plate 86 is pivotally connected, as at 88, to brackets 82 and the face of the plate is provided with an arcuate member 90 which is adapted to engage the arcuate back of the flask, as illustrated by FIG. 8, to releasably hold the flask against disk 54 with nozzle 46 inserted in opening 52 of the flask for the molding operation. A reset 92 is suitably secured to plank 12 and supports plate 86 in its operative position as illustrated by FIG. 2. It is also to be observed that the space between the nozzle 46 and bracket 82 provides a position for placing holder 56 for the molding operation.

Bracket 34, adjacent nozzle 46, carries locking means 94 for releasably holding plate 86 against the back of the flask to thereby hold the flask against disk 54 for the molding operation. For this purpose, the opposite sides of bracket 34, adjacent nozzle 46, carry vertical bars 96. Adjacent the lower end of each bar is a horizontal arm or lug 98 to which is pivoted one end of a rigid elongated member 100. At the upper end of each bar 96, a screw 102 is secured, which extends through an elongated slot 104 provided in member 100. The head of the screw provides a stop for the member which, as seen in FIG. 2, is biased to the left by a compression spring 106 that encircles the companion screw. One end of the arm 107 is pivotally connected to the other end of each member 100 and arms 107 are connected to each other by a cross-bar 108. A cross-bar 110 extends between the other ends of arms 107 and is pivotally connected to said ends. Cross-bar 110 is rectangular in cross-section and a handle 112 extends from it. A bar 114 extends from bracket 34 to support locking means 94 in its inoperative position illustrated by FIG. 2, and cross-bar 108 provides a support for handle 112 in said inoperative position.

To lock the flask in molding position, as illustrated by FIG. 8, the handle 112 is grasped by the operator and arms 107 are rotated clockwise, as viewed in FIG. 2, so that they overlie the holder 56 and the flask. Plate 86 is pivoted counterclockwise, as viewed in FIG. 2, so that its arcuate member 90 engages the back of the flask with nozzle 46 inserted in inlet opening 52 of the flask. The handle is then operated to pivot member 110 so that its cam edge 116 is against the upper part of the back of plate 86, as illustrated by FIG. 8, thereby compressing springs 106, and releasably locking the plate against the flask. The apparatus is now in position for the molding operation. To insure that the nozzle 46 and inlet opening 52 are in alignment, injector 28 can be supported at its opposite ends on adjustment screws 118.

At the conclusion of the molding operation, handle 112 is grasped by the operator and rotated to release cam edge 116 from engagement of plate 86, and the entire plate locking means 94 is then pivoted counterclockwise from the operative position illustrated by FIG. 8, to the inoperative position illustrated by FIG. 2. The flask 38 is then removed from its holder 52 and another flask is placed in the holder. The holder and flask are then positioned on the plank with the nozzle of the injector in position in the inlet opening 52 of the flask. The flask and holder are then releasably locked in position by manipulation of locking plate 86 and locking means 94, as just described, and the apparatus is again in position for another molding operation.

Plate 86 is preferably provided with an opening 120 so that in its operative locking position, the parting line between upper and lower flask parts 48 and 50 can be observed during the molding operation for leakage of plastic material to indicate to the operator that the mold cavity is filled with plastic material.

While the flask holder 74 described above is especially useful in connection with the molding of partial dentures, the size of springs 64 may be too heavy for some operators in the molding of full dentures due to the additional injection pressure required for the molding operation. Accordingly, the flask holder 74′ of FIG. 5A may be used in which corner 120 of cross-bar 72 is arcuate to provide a camming edge for forcing plate 72 down against the force of the spring.

While we have described the preferred embodiment of the invention, it will be understood that the invention can be practiced by other embodiments than what has been described herein, and the invention is not to be limited to the specific embodiment described herein but, on the contrary, is applicable to those embodiments incorporating the ideas and principles of the invention as defined in the claims.

We claim:

1. Apparatus for injecting plastic material into the mold cavity of a denture flask having an inlet opening for said plastic material, said apparatus comprising means for containing the plastic material and having an extending outlet nozzle through which said plastic material is ejected, means longitudinally spaced from said outlet nozzle for holding said flask against said outlet nozzle with the latter extending into said inlet opening to inject said plastic material into said mold cavity, said holding means including a holding member movable from an operative position in which it is in engagement with said flask to an inoperative position in which it is disengaged from said flask to permit the latter to be removed from the apparatus, and means for cooperating with said holding member to releasably hold said member in said operative position thereof, said last mentioned means including locking means movable from an inoperative position in which it is disengaged from said holding member to an operative position in which it overlies said flask and is in releasable holding engagement with said holding member, said locking means including a rigid elongated member mounted for pivotal movement adjacent one of its ends, spring means above said one end biasing said elongated member against movement, another elongated member pivotally connected at one of its ends to the opposite end of said mentioned elongated member, and a cam locking member pivotally connected adjacent the opposite end of said other elongated member for movement in the operative position of said locking means, into engagement with said holding member for releasably holding the latter.

2. Apparatus for injecting plastic material into the mold cavity of a denture flask having an inlet opening for said plastic material, said apparatus comprising means for containing the plastic material and having an outlet through which said plastic material is ejected, means longitudinally spaced from said outlet for holding said flask against said outlet with the latter in said inlet opening to inject said plastic material into said mold cavity, said holding means including a holding member, pivotally mounted for movement from an operative position in which it is in engagement with said flask to an inoperative position in which it is disengaged from said flask to permit the latter to be removed from the apparatus, and means for cooperating with said holding member to releasably hold said member in said operative position thereof, said last mentioned means including locking means movable from an inoperative position in which it is disengaged from said holding member to an operative position in which it overlies said flask and is in releasable holding engagement with said holding member, said locking means including a rigid elongated member mounted for pivotal movement adjacent one of its ends, spring means above said one end biasing said elongated member against movement, another elongated member pivotally connected at one of its ends to the opposite end of said first mentioned elongated member, and a cam locking member pivotally connected adjacent the opposite end of said other elongated member for movement, in the operative position of said locking means, into engagement with said holding member for releasably holding the latter.

3. Apparatus for injecting plastic material into the mold cavity of a denture flask, comprising a support plate for the flask, a pair of spaced superimposed plates for positioning above said support plate with said flask positioned therebetween, spring means positioned between said superimposed plates and biasing them away from each other, means connected to said support plate and movable from an inoperative position in which it is disengaged from said superimposed plates to an operative position in which it is engaged with said superimposed plates to releasably hold the latter against said flask, means for containing the plastic material and having an outlet through which said plastic material is ejected, movable means longitudinally spaced from said outlet for holding said flask against said outlet for injection of said plastic material into the mold cavity of said flask, and means for releasably holding said flask holding means in said flask holding position thereof.

4. Apparatus for injecting plastic material into the mold cavity of a denture flask, comprising a support plate for the flask, a pair of spaced superimposed plates for positioning above said support plate with said flask positioned therebetween, spring means positioned between said superimposed plates and biasing them away from each other, means connected to said support plate and movable from an inoperative position in which it is disengaged from said superimposed plates to an operative position in which it is engaged with said superimposed plates to releasably hold the latter against said flask, means for containing the plastic material and having an outlet through which said plastic material is ejected, movable means longitudinally spaced from said outlet for holding said flask against said outlet for injection of said plastic material into the mold cavity of said flask, and means for releasably holding said flask holding means in said flask holding position thereof, said last mentioned means comprising locking means movable from an inoperative position in which it is disengaged from said flask holding means to an operative position in which it is in engagement with said flask holding means.

5. Apparatus for injecting plastic material into the mold cavity of a denture flask having an inlet opening for said plastic material, said apparatus comprising a pair of longitudinally spaced supports, an injector for said plastic material for mounting on said supports and comprising a cylinder for holding said plastic material, said cylinder having an outlet nozzle through which plastic material is ejected, and movable means in said cylinder for ejecting said plastic material, means longitudinally spaced from said outlet nozzle for holding said flask against said nozzle with the latter in said inlet opening to inject said plastic material into said mold cavity, said holding means including a holding member pivotally mounted for movement from an operative position in which it is in engagement with said flask to an inoperative position in which it is disengaged from said flask to permit the latter to be removed from the apparatus, and means for cooperating with said holding member to releasably hold said member in said operative position thereof, said last mentioned means including locking means movable from an inoperative position in which it is disengaged from said holding member to an operative position in which it overlies said flask and is in releasable holding engagement with said holding member, said locking means including a rigid elongated member mounted for pivotal movement adjacent one of its ends, spring means above said one end biasing said elongated member against movement, another elongated member pivotally connected at one of its ends to the opposite end of said first mentioned elongated member, and a cam locking member pivotally connected adjacent the opposite end of said other elongated member for movement, in the operative position of said locking means, into engagement with said holding member for releasably holding the latter.

6. Apparatus for injecting plastic material into the mold cavity of a denture flask, said apparatus comprising first stationary support means, ejector means mounted on said first support means and having an outlet nozzle through which said plastic material is ejected, second stationary support means spaced longitudinally from said first support means and said outlet to provide a space in which a flask may be placed, means mounted on said second support means for movement between an operative position to hold a flask in said space against said nozzle and an inoperative non-holding position, and locking means movable between an operative position, to engage and hold said flask hold means in said operative position thereof, and an inoperative non-engaging position, said locking means being mounted for movement on said first support means, said locking means comprising a first member pivoted to said first support means, a second member pivoted to said first member, and a third member pivoted to said second member and movable to engage said flask hold means and hold the latter against a flask.

7. Apparatus for injecting plastic material into the mold cavity of a denture flask having an inlet opening for said plastic material, said apparatus comprising first stationary support means, means mounted on said first support means for containing the plastic material and having an extending outlet nozzle through which said plastic material is ejected, said nozzle having a smooth non-threaded outer surface, second stationary support means longitudinally spaced from said first support means and from said nozzle to provide a space in which a flask may be placed, a flask holding member mounted for pivotal movement on said second support means between an operative position, in which it is in engagement with a flask to hold the latter against said outlet nozzle with said nozzle extending into said inlet opening to inject said plastic material into said mold cavity, and an inoperative position in which it is disengaged from a flask to permit the latter to be removed from the apparatus, and locking means pivotally mounted on said first support means for cooperating with said holding member to releasably hold said member in said operative position thereof, said locking means comprising a rigid elongated member mounted for pivotal movement adjacent one of its ends on said first support means, spring means positioned above said one end of said elongated member and in engagement with the latter to bias said elongated member against movement, another elongated member pivotally connected at one of its ends to the opposite end of said first mentioned elongated member and movable to overlie the space in the operative holding position of said holding member, a cam locking member pivotally connected adjacent the opposite end of said other elongated member for movement in said operative holding position of said holding member to engage the latter and bias it against a flask, and a handle connected to said cam locking member.

References Cited by the Examiner

UNITED STATES PATENTS

| | | | |
|---|---|---|---|
| 1,858,144 | 5/1932 | Fariello | 269—224 X |
| 2,489,118 | 11/1949 | Brinker et al. | 269—221 |
| 2,585,112 | 2/1952 | Gravesen | 18—30 |
| 2,779,364 | 1/1957 | Farmer | 269—224 X |
| 2,892,214 | 6/1959 | McCarthy | 18—30 |
| 2,926,387 | 3/1960 | Lombardo et al. | 18—43 |

OTHER REFERENCES

German application, 1,068,456, printed November 5, 1959.

J. SPENCER OVERHOLSER, *Primary Examiner.*

MICHAEL V. BRINDISI, *Examiner.*

H. E. MINCHEW, W. L. McBAY, *Assistant Examiners.*